Patented Dec. 6, 1949

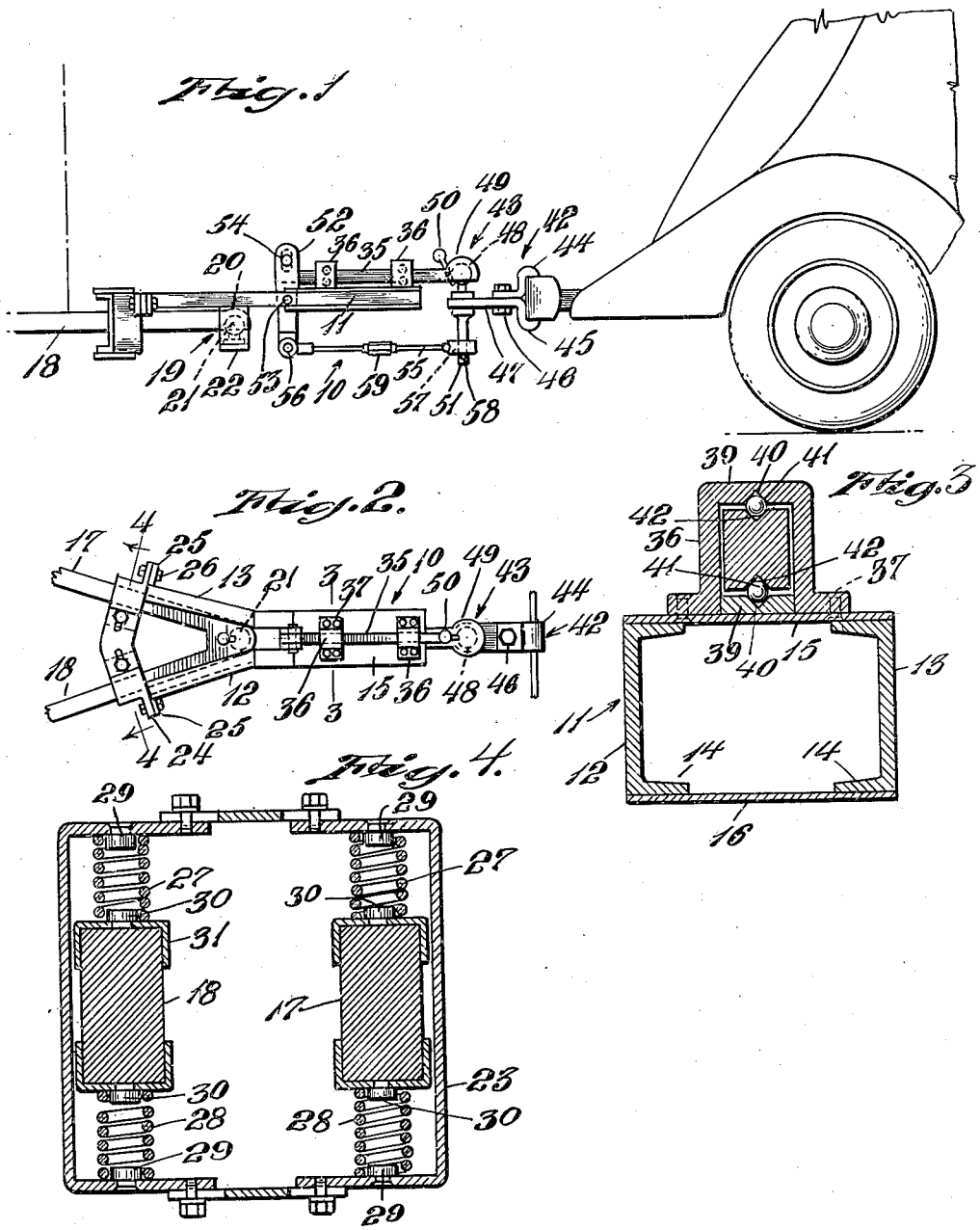

2,490,645

UNITED STATES PATENT OFFICE 2,490,645

TRAILER HITCH

Adolf Murat, Woonsocket, R. I.

Application September 19, 1946, Serial No. 697,895

7 Claims. (Cl. 280—33.4)

This invention relates to improvements in trailer hitches.

A prior hitch or dolly, such as that employed for towing a trailer, which, oftentimes is heavier than the towing vehicle, over an uneven road surface, such as sharp rises, humps, depressions or a wavy surface, cause a surge or jerking motion to be set up in the towing vehicle much to the discomfort of the occupants thereof. This surge or jerking motion is caused by sudden changes in the direction of movement between the trailer and towing vehicle such as when the wheels of the towing vehicle drop into a depression or pass over a hump in the road. Such sudden change in direction of movement will cause a longitudinal push or pull on the lighter vehicle and also a recovering pull or push. This action will continue intermittently until the vehicle wheels recover their alignment or travel again in the same plane. For example, when the rear wheels of the towing vehicle pass over a hump or sudden rise in the road, the action will have a tendency to lift the front of the trailer and a pull on the lighter vehicle will be the result. When the rear wheels of the towing car drop into a depression, the action will have the effect of slowing the movement of the towing vehicle with respect to the direction of movement of the trailer, this will result in a push on the lighter vehicle.

An object of the invention is the provision of a towing mechanism so constructed as to substantially minimize the surge or jerking motion above referred to.

Another object of the invention is the provision of a towing mechanism so constructed as to absorb the used road shocks.

Another object of the invention is the provision of a trailer hitch so constructed as to compensate for change in direction of movement between the trailer and tow vehicle due to road surface irregularity.

A more specific object of the invention is the provision of a trailer hitch so constructed as to be automatic in action to compensate for changes in direction of movement between the trailer and the tow vehicle, due to road surface irregularity.

Another object of the invention is the provision of a device of this character which may be manufactured at a comparatively low cost of production and which will be durable and satisfactory in use.

With these and other objects in view, the invention consists of certain novel features of construction, as will be more fully described and particularly pointed out in the appended claims.

In the accompanying drawings:

Fig. 1 is a side view of a portion of a trailer chassis and towing vehicle connected together by means of a trailer hitch embodying my invention;

Fig. 2 is a top plan view of the trailer hitch.

Fig. 3 is a sectional view taken substantially along line 3—3 of Fig. 2; and

Fig. 4 is a sectional view taken substantially along line 4—4 of Fig. 3.

In carrying out this invention, I make the drawbar of the trailer hitch of a construction so as to permit relative limited longitudinal movement between the towing vehicle and the trailer in such a manner that the relative movement of one vehicle will not abruptly influence the movement of the other. There is also provided a resilient restricted movable connection between the hitch and the trailer whereby usual, so called, road shocks will not be transmitted through the hitch from one vehicle to the other but will be absorbed in the resilient connection.

Referring to the drawing for a more detailed description of the invention 10 designates generally a trailer hitch having a body portion or drawbar 11. The drawbar may be of any approved manufacture but may be conveniently made of two channels 12, 13 positioned for a portion of their length generally parallel to each other in spaced relation and with the legs 14 thereof facing each other. The channels are secured together by means of upper and lower plates 15, 16 fixed thereto in any approved manner, such as by welding. One end portion of the drawbar is free of the plates 15, 16 and the channels 12, 13 at this location are bent outwardly in a substantially V-shape so as to conform generally to and receive therebetween the outwardly extending converging end portions 17, 18 of the trailer chassis.

A so-called ball hitch 19 is provided for attaching the drawbar to the chassis. This connection may be of any approved design and the socket portion thereof is fixed to the chassis at the apex of the converging portions 17, 18. The ball portion 21 of the connection is secured to a bracket 22 which depends from the drawbar.

A housing 23 is secured to the channels 17, 18 at the end of the drawbar adjacent the chassis, which housing is open at either end and through which extends the chassis portion 17, 18. This housing is provided with outwardly extending flanges 24 which abut against flanges 25 provided at the end extremity of channels 12, 13. These flanges are held together by a bolt and nut fastening 26. Compression springs 27 extend between the upper wall of the housing and the upper side of the portion 17, 18. Similar springs 28 extend between the lower wall of the housing and the lower side of the portion 17, 18. These springs are anchored at their ends by pins 29 extending inwardly from the upper and lower wall of the housing and pins 30 carried by U-shaped clips 31 positioned on the portion 17, 18. Thus a resilient mounting is provided whereby a resilient restricted movement is permitted between the chassis of the trailer and the drawbar whereby usual road shocks transmitted through the drawbar may be absorbed by the springs.

In order to permit of relative longitudinal movement between the two vehicles such as may occur in abrupt changes in the velocity of movement between the two vehicles caused by unevenness in the road surface as previously explained, I provide a tongue 35. This tongue is slidably mounted to the drawbar 11 as by means of spaced guides 36. Each guide is similar and is secured to the upper plate 15 as by means of rivets 37. In the upper and lower walls 38, 39 of the guides, a cavity 40 is provided in which is received an anti-friction member 41 which in the present instance are ball bearings. The tongue 35 is provided with alined grooves 42 in which the members 41 extend in contact with the walls of the grooves.

The tongue 35 extends beyond the drawbar 11 and is attached to a clamp generally designated 42 by means of a ball hitch 43. The ball hitch is similar to the ball hitch 19 and may be of any approved design, the details of which form no part of this invention. The clamp, in this particular instance is of a construction adapted to engage the bumper of a motor vehicle and comprises a pair of jaws 44, 45 which are secured to each other in clamping relation by a bolt and nut fastening 46. The jaw 45 has an arm 47 on which is mounted the ball portion 48 of the ball hitch. The socket portion 49 is secured or otherwise provided at the end extremity of the tongue 35 and receives the ball 48 which may be locked therein by a ball lock 50 usually provided on such devices. A pin 51 is mounted on the arm 47 so as to depend therefrom in line with the center of the ball 48.

The opposite end of the tongue 35 is secured to a lever 52 which is pivoted to the drawbar as at 53 so as to normally extend generally vertically. The end of the arm of the lever which extends above the pivot 53 is bifurcated and receives the end of the tongue 35 which is pivotally attached thereto by a pivot pin 54. A connecting rod 55 has one end pivotally attached to the lower arm of the lever 52 as at 56. The other end of the rod is provided with an opening 57 through which extends the pin 51 and is retained in position by a pin 58. The rod 55 is made in two sections, connected together by a turnbuckle 59 whereby the length of the rod may be adjusted. It will be apparent that when the pin 51 is inclined with the towing vehicle to the right or left, as shown in Fig. 1, the motion will be transmitted through the connecting rod 55 to the lever 52 to move the tongue to increase or decrease the length of the hitch.

In the operation of the apparatus above described when the rear wheels of the tow vehicle passes over a hump or sharp rise or drop into a depression the sudden change in direction of pull on the trailer will be absorbed by the relative movement between the drawbar 11 and the tongue 35.

I claim:

1. In a trailer hitch, a drawbar having spaced guides thereon and having one end portion thereof adapted to be secured to a trailer chassis, a tongue slidably received in said guides, anti-friction members positioned between the walls of said guides and tongue, a clamp through which said drawbar is attached to a towing vehicle, a universal connection between said clamp and one end portion of said tongue, a connection from said universal connection to the other end portion of said tongue whereby said tongue is relatively moved in response to movement of said universal connection.

2. In a trailer hitch, a drawbar having one end portion thereof adapted to be secured to a trailer chassis, a tongue slidably related to said drawbar, a clamp through which said drawbar is attached to a towing vehicle, a universal connection between said clamp and one end portion of said tongue, a lever pivotally attached to said drawbar with an arm thereof extending above said drawbar and pivotally attached to said tongue, the other arm of said lever extending below said drawbar, and a connection between the lower arm of said lever and said universal connection whereby said tongue is relatively moved in response to movement of said universal connection.

3. A trailer hitch, a drawbar having one end portion thereof adapted to be secured to a trailer chassis, a tongue slidably related to said drawbar, a clamp through which said drawbar is attached to a towing vehicle, a universal connection between said clamp and one end portion of said tongue, a lever pivotally attached to said drawbar with an arm thereof pivotally secured to said tongue, an extension on said universal connection movable therewith and a connection between said extension and said lever whereby said lever is moved about its pivot to move said tongue upon movement of said extension.

4. In a trailer hitch, a drawbar, means for attaching said drawbar to the chassis of a trailer, means for attaching said drawbar to a towing vehicle, means carried by said drawbar at a location thereon rearwardly of the point of attachment of the drawbar to the chassis for resiliently engaging said chassis for resilient restricted movement therebetween comprising a housing carried by said drawbar between the walls of which said chassis extends and compression springs extending from the said walls into engagement with said chassis on opposite sides thereof.

5. A trailer hitch, a drawbar having one end portion thereof adapted to be secured to a trailer chassis, a tongue slidably related to said drawbar, a clamp through which said drawbar is attached to a towing vehicle, a universal connection between said clamp and one end portion of said tongue, a lever pivotally attached to said drawbar with an arm thereof pivotally secured to said tongue, an extension on said universal connection movable therewith, and an adjustable connection between said extension and said lever whereby said lever is moved about its pivot to move said tongue upon movement of said extension.

6. A trailer hitch, a drawbar having one end portion thereof adapted to be secured to a trailer chassis, a tongue slidably related to said drawbar, a clamp through which said drawbar is attached to a towing vehicle, a pin fixed to said clamp, a universal connection between one end of said pin and an end portion of said tongue, a lever pivotally attached to said drawbar with an arm thereof pivotally secured to said tongue, and a connecting rod having one end thereof secured to said pin and the other end thereof to said lever whereby said lever is moved about its pivot to move said tongue upon relative movement of said pin.

7. A trailer hitch, a drawbar having one end portion thereof adapted to be secured to a trailer chassis, a tongue slidably related to said drawbar, a clamp through which said drawbar is attached to a towing vehicle, a pin fixed to said clamp, a universal connection between one end of said pin and an end portion of said tongue, a lever pivotally attached to said drawbar with an arm thereof pivotally secured to said tongue, and an adjustable connecting rod having one end thereof secured to said pin and the other end thereof to said lever whereby said lever is moved about its pivot to move said tongue upon relative movement of said pin.

ADOLF MURAT.

REFERENCES CITED

The following references are of record in the file of this patent:

UNITED STATES PATENTS

| Number | Name | Date |
|---|---|---|
| 1,404,575 | Brown | Jan. 24, 1922 |
| 2,254,532 | Knox | Sept. 2, 1941 |
| 2,341,965 | Wagner | Feb. 15, 1944 |